United States Patent [19]

Masom

[11] Patent Number: 4,829,834

[45] Date of Patent: May 16, 1989

[54] SPEED AND TORQUE SENSORS

[75] Inventor: Ronald A. Masom, Southampton, England

[73] Assignee: Smiths Industries Public Limited Company, London, England

[21] Appl. No.: 227,564

[22] Filed: Aug. 3, 1988

[30] Foreign Application Priority Data

Aug. 12, 1987 [GB] United Kingdom ............... 8719120
Aug. 20, 1987 [GB] United Kingdom ............... 8719681

[51] Int. Cl.$^4$ ............................................. G01L 3/10
[52] U.S. Cl. ............................. 73/862.34; 310/155; 324/174
[58] Field of Search ........... 73/862.33, 862.34, 861.78; 324/174; 310/155

[56] References Cited

U.S. PATENT DOCUMENTS 3,252,024  5/1966  Loudon ............................. 310/155
3,676,765  7/1972  Westcott ....................... 324/174 X
3,844,168 10/1974  Tenkman ....................... 73/862.34
4,602,515  7/1986  Eichenlaub ................... 73/862.34
4,647,892  3/1987  Hewitt ............................ 310/155

Primary Examiner—Charles A. Ruehl
Attorney, Agent, or Firm—Pollock, Vande Sande & Priddy

[57] ABSTRACT

A speed and torque sensor has a permanent magnet and a pole piece about which are wound together a torque coil and two speed coils and identical with the torque coil. The coils and permanent magnet assembly are contained in an outer housing together with resistors and connected in series with the respective speed coils. The resistance of the resistors and is approximately fifty times that of the speed coil and so that shorting of the output of a speed coil beyond the resistor does not substantially increase current drawn by the coil. A temperature sensor in the housing enables compensation for changes in temperature on modulus of elasticity of the member subject to torque.

9 Claims, 2 Drawing Sheets

SPEED AND TORQUE SENSORS

BACKGROUND OF THE INVENTION

This invention relates to a speed and torque sensors.

The invention is more particularly concerned with sensors for providing outputs representative of the speed and torque of a shaft by detecting movement of magnetic members mounted on the shaft.

An output representative of the speed of a shaft is readily provided by means of a toothed wheel on the shaft which alters the magnetic field in the region of an electromagnetic sensor, as the teeth on the wheel pass in front of the sensor. The sensor commonly takes the form of a coil wound around a permanent magnet assembly, the coil producing an alternating electrical signal at the same frequency as that at which the teeth pass in front of the magnet assembly. By measuring the frequency or time period, a measure of the shaft speed can be provided.

Torque can be measured by securing two wheels on the shaft at opposite ends of a portion of the shaft of known modulus of elasticity. The wheels are arranged to have teeth that are interdigitated with each other in front of the sensor. An increase in torque causes twisting of that portion of the shaft between the wheels and hence causes angular displacement of one wheel relative to the other. This causes movement of the two sets of teeth relative to one another, altering the separation between them. The torque, therefore produces a shift in the output pulses arising from the two sets of teeth.

It is common practice to have several coils in the sensor, wound together, so that the output from each coil can be used for a different purpose or to provide redundancy. For example, a torque output could be derived from one coil and a speed output derived from another coil. Such sensors can function satisfactorily in normal circumstances with an acceptable accuracy. If, however, one of the coils is shorted, such as by failure in the measuring circuit or interconnecting cables, this causes a relatively high current to be drawn by that coil and thereby alters the magnetic circuit formed by the coils and the permanent magnet assembly. The result of shorting one coil is to alter the voltage/time characteristic of the output of the other coil. Where the other coil provides only a speed signal, this does not result in any adverse effect on accuracy. If, however, the output of the other coil is used to measure torque, this can have an adverse effect on accuracy.

BRIEF SUMMARY OF THE INVENTION

It is an object of the present invention to provide a speed and torque sensor in which the accuracy of the torque signal is not significantly affected by shorting of another coil.

According to the present invention there is provided a speed and torque sensor arrangement including a permanent magnet assembly, at least one speed coil located adjacent the assembly, at least one torque coil located adjacent the assembly, the coils being arranged to provide electrical output signals in response to movement of a rotating magnetic member in front of the assembly, the sensor arrangement including resistance means connected in series with the or each respective speed coil, and the or each resistance means having a resistance at least several times the resistance of the respective speed coil such that shorting of the output of the speed coil beyond the resistance means does not substantially increase current drawn by said coil.

In this way, if the speed coil is shorted, there will be very little effect on the accuracy of the torque coil.

The or each resistance means preferably has a resistance substantially fifty times the resistance of the respective speed coil. The sensor preferably includes an outer housing enclosing the permanent magnet assembly and the coils, the or each resistance means being contained within the outer housing. The or each speed coil may be wound with the or each torque coil and may be substantially identical with the or each torque coil. The permanent magnet assembly may include a permanent magnet and a pole piece. Preferably the speed and torque coils are wound on the pole piece. The sensor arrangement may include temperature sensing means.

A system including a speed and torque sensor in accordance with the present invention will now be described, by way of example, with reference to the accompanying drawings.

DESCRIPTION OF PREFERRED EMBODIMENT

Figure 1:
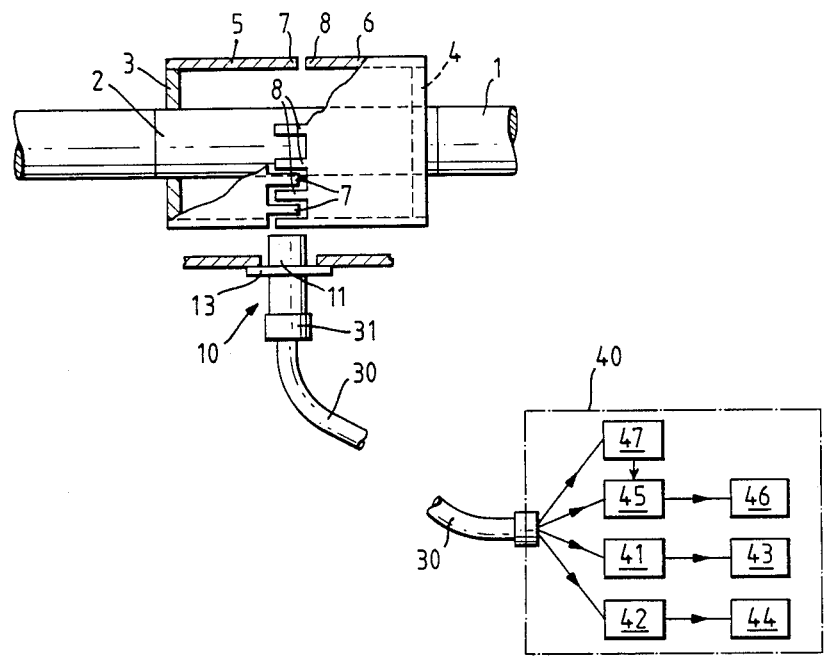
FIG. 1 illustrates the system schematically.

With reference to FIG. 1, there is illustrated a system for sensing the torque and speed of a rotating shaft 1. The shaft 1 has a portion 2 along its length that has a known modulus of elasticity. At opposite ends of the portion 2 are mounted respective wheels 3 and 4 which rotate with the shaft. Each wheel supports a cylindrical sleeve 5 and 6 respectively of a magnetic material, such as steel, that extends coaxially of the shaft towards the other sleeve. The sleeves 5 and 6 are both formed with castellations or teeth 7 and 8 that are interditated with teeth on the other sleeve.

The system also includes a sensor 10 of generally cylindrical shape that extends radially of the shaft 1, with its sensing tip 11 located in close proximity to the teeth 7 and 8.

An output cable 30 has a connector 31 at one end coupled with the sensor 10 and its other end coupled with a remote measuring unit 40 which provides signals representing speed and torque for display or other utilisation.

Figure 2:
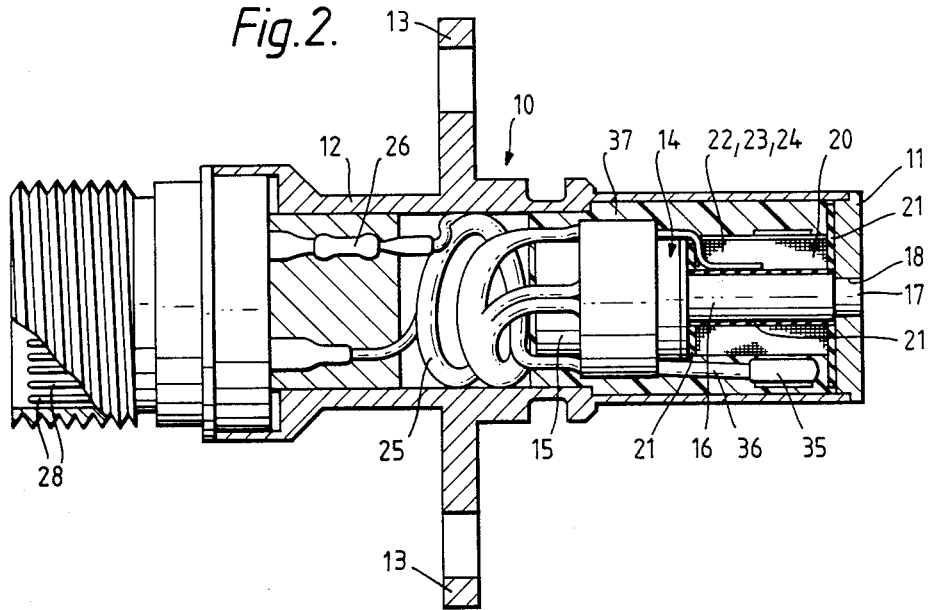
FIG. 2 is a sectional side elevation through the sensor.
Figure 3:
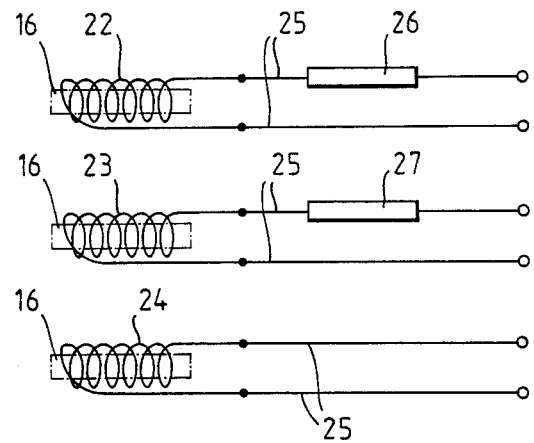
FIG. 3 illustrates the electrical circuit of the sensor.

With reference now also to FIGS. 2 and 3, the sensor 10 has an outer stainless steel housing 12 with a radially extending flange 13 by which the sensor is mounted. Within the housing, close to its forward sensing tip 11, there is located a permanent magnet assembly 14 formed by a cylindrical permanent magnet 15 to which is brazed a soft iron pole piece 16. The pole piece 16 has a smaller diameter than the permanent magnet 15 and projects axially forwardly from the magnet. The forward end 17 of the pole piece projects through an aperture 18 in the housing 12 to which it is brazed.

The pole piece 16 is encompassed by a coil assembly 20 which is insulated from the pole piece and housing by insulating sheets 21. The coil assembly 20 comprises three separate coils 22, 23 and 24 that are wound together. The coils could be located adjacent the permanent magnet assembly in other configurations. Each coil 22 to 24 is identical, being made of copper wire with a high temperature resistant resin insulation and having a resistance of 35 ohm each. The ends of each coil are connected to a respective one of six insulated wires 25 that extend rearwardly of the housing 12. One of the wires 25 leading from each of two of the coils 22 and 23 is joined to a respective resistor 26 and 27 as a series connection, as shown in FIG. 3. The two resistors 26 and 27 are identical having a resistance of 2Kohm. Six output pins 28 at the rear end of the sensor are connected to respective ones of the wires 25 or to the resistors 26 and 27, so that electrical connection can be established with the coils 22 to 24 by the connector 31 on the cable 30.

Also located in the housing 12 close to the sensing tip 11 of the sensor 10, is a temperature sensor 35, such as a platimum resistance element. Wires 36 extend rearwardly from the temperature sensor 35 and are joined to respective ones of the output pins 28.

The forward end of the sensor is potted with an epoxy resin 37, between the housing 12, the magnet assembly 14, the coil assembly 20 and the temperature sensor 35.

Output signals from the three coils 22 to 24, and from the temperature sensor 35, are supplied via the cable 30 to the measuring unit 40. In the measuring unit 40, the signals from the two coils 22 and 23, which have the resistors 26 and 27 connected in series, are supplied to respective speed measuring circuits 41 and 42 which each provide outputs representing speed to utilisation devices 43 and 44. The utilisation devices will generally be different from one another, for example, one may be a display and the other a unit for effecting control of the shaft speed. Alternatively, the utilisation devices 43 and 44 may be off the same kind so that a degree of redundancy is provided.

Output signals from the other coil 24 are supplied to a torque measuring unit 45 which provides output signals to a utilisation device, such as a display 46.

The resistance of the temperature sensor 35 is measured by a temperature measuring unit 47 which provides an output to the torque measuring unit 45. This temperature signal is implemented by the torque measuring unit 45 to compensate for changes with temperature in the modulus of elasticity of the shaft 1.

The manner in which speed and torque are calculated is conventional and will not be described in detail here.

Figure 4:
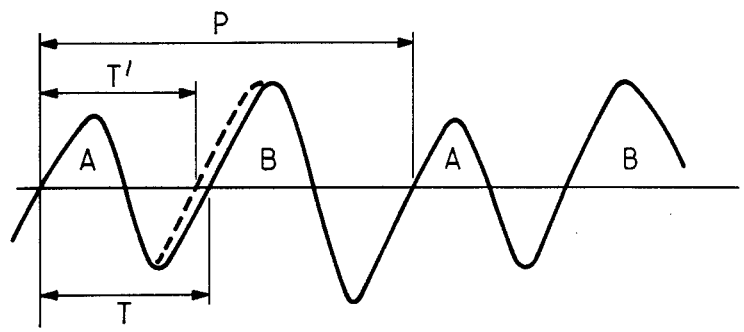
FIG. 4 shows the output waveform from a coil of the sensor.

In operation, rotation of the shaft 1 causes an output signal waveform from each coil 22 to 24 of the kind shown in FIG. 4. The waveform comprises two positive peaks 'A' and 'B' each cycle, which arise from passage in front of the sensor of one of the teeth 7 and one of the teeth 8 respectively. The separation between respective peaks 'A' or 'B' in adjacent cycles, indicates the time period P of the cycles and provides a measure of the speed of rotation of the shaft. The separation T between corresponding points on peaks 'A' and 'B', arising from different sets of teeth, provides a measure of the torque applied to the shaft, because changes in torque will cause relative angular displacement between the wheels 3 and 4 and hence between the teeth 7 and 8.

Conventional torque and speed sensors, that is sensors without resistors in series with the speed coils, suffer from inaccuracy if one or other of the speed coils is shorted, such as by damage or fault in the cable or associated measuring unit. This arises because the low resistance of the shorted coil causes a significant increase in current drawn by the coil. This has an effect on the magnetic circuit between the magnet assembly, coil assembly and teeth which causes a displacement of the slope produced by the torque coil as shown by the broken line in FIG. 4. Such a change in the output signal of the torque coil will cause a reduction in the measured torque from T to T'. This effect is worse at higher speeds because the peaks 'A' and 'B' will be closer. In an uncompensated sensor, that is, without resistors, the potential error could be about 4% using a coil wound from copper wire.

Use of the resistors, in the present invention significantly increases the impedance of the speed coil circuit, so that the change in current drawn by the speed coil, if it is shorted, is substantially reduced. This, of course, only applies if the coil is shorted externally of the sensor, beyond the coil resistor 26 or 27, that is, with the coil resistor included in the shorted coil circuit. The use of a 500 ohm resistor with a 35 ohm coil would reduce the shift of the slope to about ½%; a 1K ohm resistor would reduce the potential slope shift to about ¼%; and a 2K ohm resistor allows a negligible shift. In general, the resistor should be at least several times the resistance of the coil and preferably about fifty times its resistance.

The increase in accuracy of the sensor that is achieved by the resistors does not require any change to the coil windings, which can still be identical with each other, thereby simplifying assembly. The same housing can also be used, since the space taken by the resistors is relatively small, thereby obviating the need to change the manner of mounting the sensor.

It will be appreciated that the invention can also be applied to sensors having more than one torque coil and to sensors having only one, or more than two speed coils.

The resistor need not necessarily be mounted in the probe, but could be located at any other point. The location of the resistors will depend on the most likely location of any shorting. If shorting is only likely to occur in the measuring unit, the resistors need only be connected at, for example, the output of the measuring unit, or in the connector coupled to the measuring unit.

What I claim is:

1. A speed and torque sensor arrangement of the kind comprising a permanent magnet assembly, at least one speed coil, said speed coil being located adjacent said assembly, and at least one torque coil, said torque coil being located adjacent said assembly so that the speed and torque coils provide electrical output signals in response to movement of a rotating magnetic member in front of the assembly, the improvement wherein the sensor arrangement includes at least one resistance means, and means connecting the or each said resistance means in series with the or each respective speed coil, the resistance of the or each resistance means being at least several times the resistance of the respective speed coil such that shorting of the output of the speed coil beyond the resistance means does not substantially increase current drawn by said coil.

2. A speed and torque sensor arrangement according to claim 1, wherein the or each resistance means has a resistance substantially fifth times the resistance of the respective speed coil.

3. A speed and torque sensor arrangement according to claim 1, wherein the sensor arrangement includes an outer housing, wherein said outer housing encloses said permanent magnet assembly and said coils, and wherein the or each resistance means is contained within said outer housing.

4. A speed and torque sensor arrangement according to claim 1, wherein the or each speed coil is wound with the or each torque coil.

5. A speed and torque sensor arrangement according to claim 1, wherein the or each speed coil is substantially identical with the or each torque coil.

6. A speed and torque sensor arrangement according to claim 1, wherein the permanent magnet assembly comprises a permanent magnet and a pole piece joined with said permanent magnet.

7. A speed and torque sensor arrangement according to claim 6, wherein the speed and torque coils are wound on said pole piece.

8. A speed and torque sensor arrangement according to claim 1, wherein the sensor arrangement includes temperature sensing means.

9. A speed and torque sensor arrangement comprising: a permanent magnet assembly; at least one speed coil, said speed coil being wound around said assembly; at least one torque coil, said torque coil being wound around said assembly; an outer housing, said outer housing enclosing said assembly and said speed and torque coils, said outer housing being shaped for mounting said sensor arrangement in the region of a rotating magnetic member such that the speed and torque coils provide electrical output signals in response to movement of said magnetic member; at least one resistor; means connecting the or each said resistor in said outer housing in series with the or each respective speed coil, the resistance of the or each resistor being substantially fifth times the resistance of the respective speed coil such that shorting of the output of the speed coil outside the housing does not substantially increase current drawn by said coil.

* * * * *